UNITED STATES PATENT OFFICE.

GEORGE WEST, OF SYRACUSE, NEW YORK.

COMPOSITION OF MATTER FOR ARCHITECTURAL PURPOSES.

SPECIFICATION forming part of Letters Patent No. 422,171, dated February 25, 1890.

Application filed January 16, 1889. Renewed October 14, 1889. Serial No. 326,930. (No specimens.)

*To all whom it may concern:*

Be it known that I, GEORGE WEST, of Syracuse, in the county of Onondaga, in the State of New York, have invented new and useful Improvements in Composition of Matter for Architectural Purposes, of which the following is a full, clear, and exact description.

This invention pertains to the class of compounds which are mixed with plastering material and other mineral cements used for various architectural purposes, said compounds being usually designed to retard the setting of the plaster and to improve its adhesive and cohesive qualities.

The object of my present invention is chiefly to impart to the plastering material or mineral cement a consistency which allows it to be more easily worked under the trowel or modeling-tool; and to that end the invention consists, chiefly, of a compound of glue or its equivalent and sal-soda, which compound is prepared by dissolving thirty pounds of glue in thirty pounds of water or other suitable solvent and mixing therewith the sal-soda in proportion of ten pounds of the latter to thirty pounds of glue. This compound is designed to be mixed with plaster or other mineral cements, for the purpose hereinbefore stated. When it is desired to put up this compound in convenient packages for putting it on the market, I convert said liquid compound into a dry powder by thoroughly mixing therewith a suitable dry pulverized or comminuted absorbent, either mineral or vegetable, preferably mineral. The compound thus prepared is also better adapted to be more thoroughly and uniformly mixed with the plaster or other mineral cements, as aforesaid.

In practice I prefer to use about one hundred and twenty-five pounds of plaster-of-paris and one hundred and twenty-five pounds of pulverized clay, preferably china-clay, for said dry absorbent; and when it is desired to obtain a plastering material or cement designed to become very hard I add to the aforesaid compound about six pounds of alum or saltpeter, and the quality of the compound may be further improved by adding thereto from two to six pounds of oil, preferably lard or cotton-seed oil.

The aforesaid compound, with or without the alum and oil, I dry either by natural heat or by artificial heat, and then grind it or otherwise reduce it to a powdered condition, and it is then ready for use in connection with either plaster-of-paris or Portland cement or other analogous mineral cement and fiber and other materials mixed with said plaster or cement.

What I claim is—

1. A composition of matter to be used with plastering material and other mineral cements, consisting of glue and sal-soda, as set forth.

2. A composition of matter to be used with plastering material and other mineral cements, consisting of glue, sal-soda, and water, as set forth.

3. The composition of matter consisting of glue, sal-soda, water, and pulverized absorbent, as set forth.

4. The composition of matter consisting of glue, sal-soda, water, alum or its described equivalent, and pulverized absorbent, as set forth.

5. The composition of matter consisting of glue, sal-soda, water, alum or its described equivalent, oil, and pulverized absorbent, as specified.

In testimony whereof I have hereunto signed my name, in the presence of two witnesses, at Syracuse, in the county of Onondaga, in the State of New York, this 14th day of January, 1889.

GEORGE WEST. [L. S.]

Witnesses:
 SAMUEL S. RUSTON,
 C. H. DUELL.